(12) United States Patent
Holt et al.

(10) Patent No.: US 12,725,532 B1
(45) **Date of Patent: *Sep. 1, 2026**

(54) ADAPTIVE EDUCATIONAL ACTIVITIES

(71) Applicant: Amplify Education, Inc., Brooklyn, NY (US)

(72) Inventors: Laurence Holt, Brooklyn, NY (US); Laura Vila Rawson, New York, NY (US); Danielle Damico, Celebration, FL (US); Christopher Keith Romero, New York, NY (US)

(73) Assignee: Amplify Education, Inc., Brooklyn, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/775,405

(22) Filed: Jul. 17, 2024

Related U.S. Application Data

(63) Continuation of application No. 18/199,028, filed on May 18, 2023, now Pat. No. 12,046,157, which is a (Continued)

(51) Int. Cl.
*G09B 7/08* (2006.01)
*G06F 16/28* (2019.01)
(Continued)

(52) U.S. Cl.
CPC ............. *G09B 7/08* (2013.01); *G06F 16/285* (2019.01); *G09B 7/077* (2013.01); *H04L 63/102* (2013.01); *G09B 17/003* (2013.01)

(58) Field of Classification Search
CPC ........ G09B 7/08; G09B 7/077; G09B 17/003; G06F 16/285; H04L 63/102
(Continued)

(56) References Cited

U.S. PATENT DOCUMENTS

| | | | | |
|---|---|---|---|---|
| 8,755,737 | B1 * | 6/2014 | Galen | G09B 7/08 434/323 |
| 9,400,956 | B2 * | 7/2016 | Eggebraaten | G06N 7/01 |

(Continued)

FOREIGN PATENT DOCUMENTS

| | | | | |
|---|---|---|---|---|
| CA | 2838210 | A1 * | 6/2014 | G09B 5/00 |
| GB | 2443753 | B * | 12/2009 | G09B 7/00 |
| WO | WO 2014152025 | | 9/2014 | |

*Primary Examiner* — Khanh Q Dinh
(74) *Attorney, Agent, or Firm* — Fish & Richardson P.C.

(57) ABSTRACT

Methods, systems, and apparatus, including computer programs encoded on a computer storage medium, for adaptive educational activities are disclosed. In one aspect, a computer-implemented method includes receiving, by a computing device that is configured to grant a given user access to a first group of activity modules based on a classification of the given user, user data and classification data. The method includes granting the user access to a first activity module and a second activity module, and preventing the user from accessing a third activity module. The method includes receiving interaction data based on the user interacting with the first activity module, and determining that the interaction data indicates an improper classification of the user. Based on the interaction data, the method includes maintaining the classification of the user, granting the user access to a fourth activity module, and preventing the user from accessing the second activity module.

20 Claims, 10 Drawing Sheets

Related U.S. Application Data continuation of application No. 16/539,449, filed on Aug. 13, 2019, now Pat. No. 11,676,504.

(51) Int. Cl.
*G09B 7/077* (2006.01)
*H04L 9/40* (2022.01)
*G09B 17/00* (2006.01)

(58) Field of Classification Search
USPC .......................................... 709/220, 223–229
See application file for complete search history.

(56) References Cited

U.S. PATENT DOCUMENTS 10,347,148 B2 * 7/2019 Slivka ...................... G09B 7/08
10,552,764 B1 2/2020 Carlin
11,328,620 B2 5/2022 Grant et al.
11,462,119 B2 * 10/2022 Slivka ...................... G09B 7/08
11,469,974 B1 10/2022 Cruise
11,605,098 B1 3/2023 Park et al.
11,657,071 B1 5/2023 Rywelska et al.
11,676,504 B1 * 6/2023 Holt ......................... G09B 7/00 434/353
12,046,157 B1 * 7/2024 Holt ....................... G09B 7/077
2006/0235732 A1 10/2006 Miller et al.
2006/0265418 A1 11/2006 Dolezal et al.
2008/0275309 A1 11/2008 Stivoric et al.
2009/0177068 A1 7/2009 Stivoric et al.
2011/0294106 A1 * 12/2011 Lennox .................... G09B 7/00 434/322
2012/0122066 A1 5/2012 Dohring et al.
2012/0288841 A1 * 11/2012 Srinivas ................... G09B 7/02 434/350
2013/0260346 A1 10/2013 Wood et al.
2014/0106877 A1 4/2014 Knutsson et al.
2014/0149418 A1 5/2014 Qin et al.
2014/0155397 A1 * 6/2014 Heymach ............. C12Q 1/6886 514/266.4
2014/0356837 A1 * 12/2014 Kutty ....................... G09B 7/02 434/322
2015/0050625 A1 2/2015 Stein et al.
2015/0235564 A1 * 8/2015 Lynch ...................... G09B 5/02 434/362
2015/0310002 A1 10/2015 Yu et al.
2015/0341385 A1 11/2015 Sivan et al.
2016/0027051 A1 1/2016 Gross
2016/0048934 A1 2/2016 Gross
2016/0275804 A1 9/2016 Koppel et al.
2016/0335913 A1 11/2016 Grant et al.
2017/0124472 A1 5/2017 Fu et al.
2017/0287356 A1 10/2017 Stephen et al.
2017/0316528 A1 11/2017 Willcox et al.
2017/0345327 A1 * 11/2017 Tai ........................... G09B 7/08
2018/0053327 A1 2/2018 Contractor et al.
2018/0268309 A1 9/2018 Childress et al.
2018/0268727 A1 9/2018 Dohring et al.
2018/0272889 A1 9/2018 Nakamura et al.
2019/0113973 A1 4/2019 Coleman et al.
2019/0130375 A1 * 5/2019 Nakai .................. G06Q 20/322
2019/0132350 A1 5/2019 Smith et al.
2019/0197912 A1 * 6/2019 Burgin ..................... G09B 7/08
2019/0333403 A1 * 10/2019 Slivka ...................... G09B 7/08
2020/0051480 A1 2/2020 Chang et al.
2020/0357296 A1 * 11/2020 Sharma .............. G06Q 50/2057
2021/0142213 A1 5/2021 Han et al.
2021/0244365 A1 8/2021 Assouad
2021/0383711 A1 * 12/2021 Panuganty ............ G06F 40/143

* cited by examiner

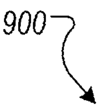

Receive user data identifying a user and classifying data indicating a classification of a user 902

Based on the classification of a user, grant the user access to a first activity module and a second activity module, and prevent the user from accessing a third activity module 904

Receive interaction data based on the user interacting with the first activity module 906

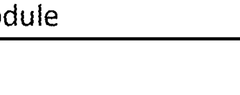

Determine that the interaction data indicates an improper classification of the user 908

Based on the interaction data, maintain the classification of the user, grant the user access to a fourth activity module, and prevent the user from accessing the second activity module 910

FIG. 9

ADAPTIVE EDUCATIONAL ACTIVITIES

CLAIM OF PRIORITY

This application is a continuation of U.S. patent application Ser. No. 18/199,028, filed on May 18, 2023, which is a continuation of U.S. patent application Ser. No. 16/539,449, filed on Aug. 13, 2019, now U.S. Pat. No. 11,676,504, the entire contents of which are hereby incorporated by reference.

FIELD

This document relates to educational technology.

BACKGROUND

In an educational setting, such as elementary or secondary school, educational technology can be used to provide interactive, individualized lessons to students. Educational technology can be used on laptops, tablets, desktop computers, or other computing devices, in or out of the classroom.

SUMMARY

In general, one innovative aspect of the subject matter described in this specification can be embodied in a computer-implemented method that includes receiving, by a computing device that is configured to grant a given user access to a first group of activity modules based on a classification of the given user, user data and classification data. The user data identifies a user, while classification data indicates the classification of the user. The method includes granting the user access to a first activity module and a second activity module based on the classification data, and preventing the user from accessing a third activity module. The method includes receiving interaction data based on the user interacting with the first activity module, and determining that the interaction data indicates an improper classification of the user. Based on the interaction data, the method includes maintaining the classification of the user, granting the user access to a fourth activity module, and preventing the user from accessing the second activity module.

Implementations of the foregoing aspects can include any, all, or none of the following features. The method may include receiving a request to view a graphical interface that displays a progress of the user. In response to receiving the request to view the graphical interface, the method may include determining an additional classification of the user based on the interaction data. The method may include determining, from among the first, second, third, and fourth activity modules, which activity modules are associated with the classification of the user and which activity modules are associated with the additional classification of the user, and generating the graphical interface that includes the progress of the user with respect to the activity modules that are associated with the classification of the user and the additional classification of the user. The classification of the user can be a school grade of the user in which the user is enrolled. The additional classification of the user can be an effective school grade of the user based on the interaction data.

The method may include receiving, by the computing device, additional interaction data based on the user interacting with the fourth activity module. The method may include, based on the additional interaction data, maintaining the classification of the user; and granting the user access to the second activity module.

The method may include receiving, by the computing device, assessment data that reflects a progress of the user, and analyzing the assessment data that reflects the progress of the user. Maintaining the classification of the user, granting the user access to the fourth activity module, and preventing the user from accessing the second activity module can be based further on analyzing the assessment data that reflects the progress of the user.

The method may include receiving, by the computing device, and from an additional user, assessment data that reflects a progress of the user, and analyzing the assessment data that reflects the progress of the user. Maintaining the classification of the user, granting the user access to the fourth activity module, and preventing the user from accessing the second activity module is based further on the analyzing the assessment data that reflects the progress of the user.

Each activity module can be an electronic book that includes content that is configured to teach the user a particular skill.

The method may include granting, by the computing device, an additional user access to the third activity module and a fifth activity module, and receiving additional interaction data based on the additional user interacting with the third activity module and the fifth activity module through a quest that creates a narrative structure around the third activity module and the fifth activity module. Receiving the interaction data based on the user interacting with the first activity module can include receiving the interaction data based on the user interacting with the first activity module and the second activity module through the same quest that creates the same narrative structure around the first activity module and the second activity module.

The method may include, in response to determining that the interaction data indicates an improper classification of the user, accessing, by the computing device, an activity module graph that includes nodes that each represent an activity module and edges that connect each node. Based on nodes connected to a node that corresponds to the first activity module, the method may include identifying, by the computing device, the fourth activity module.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

BRIEF DESCRIPTION OF THE DRAWINGS

FIG. 9 is a flow diagram showing an example process for granting students access to activity modules.

Like reference numbers and designations in the various drawings indicate like elements.

DETAILED DESCRIPTION

Figure 1:
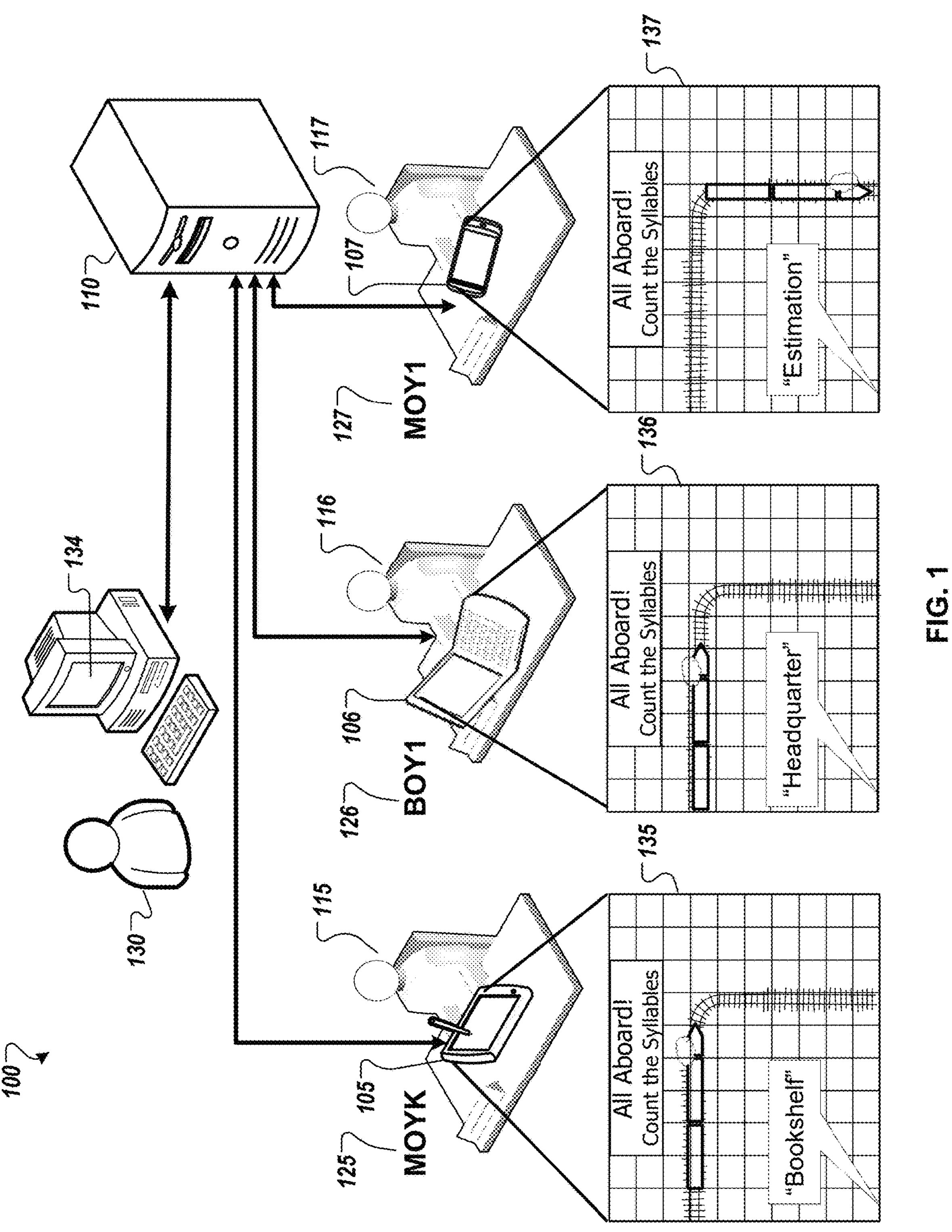
FIG. 1 illustrates an example system for providing students with individualized computer-based activity modules.

In an educational setting, such as elementary or secondary school, educational technology can be used in a classroom to provide interactive, individualized lessons to students. Education technology can be used on laptops, tablets, desktop computers, or other computing devices, in or out of the classroom. Using educational technology in a classroom allows students to proceed through lessons at their own pace.

Users, such as students within a class, can be of varying skill levels. In a typical classroom, a teacher tasks all student the same assignments. The students are typically expected to complete the assignments within a given time frame. Advanced students may be tasked with assignments that are below their skill level and therefore do not present a challenge. Alternatively, less advanced students may be tasked with assignments that they are not ready for because they have not yet mastered prerequisite skills. Advanced students may progress quickly through the assignments, while other students may take a long time to successfully complete the tasks, or may not successfully complete the tasks at all.

Educational technology can help teachers assign appropriate tasks to students. Using educational technology in a classroom allows students to complete lessons individually, at their own pace. Lessons can be, for example, interactive activity modules that require students to complete educational activities in order to learn and practice skills. Advanced students can be tasked with advanced lessons, while less advanced students can be tasked with simpler lessons. However, even when using educational technology in a classroom, teachers need to know the individual skill levels of students in order to assign them the appropriate individualized lessons.

When using educational technology, teachers can assign lessons to individual students based on their skill levels, or classifications. In order to assign an appropriate lesson to a student, a teacher must know the skill level of the student, and then choose the appropriate lesson to assign. It can be challenging for teachers to track the skill levels of all students in a class. Additionally, though a teacher may know the general skill level of a student, the teacher may not know the detailed skills that the student has mastered. For example, a teacher may know that a particular student has a general reading level above the student's school grade level. However, the teacher may not be aware that the student specifically excels at word recognition, but struggles with identifying the main idea of a story.

Educational technology such as an educational software program can be used to assess a student's proficiency at various skills and to assign appropriate lessons for the student. An activity module graph, or learning map, can be used to identify the expected proficiency of students at the beginning, middle, and end of the school year for various school grade levels, such as kindergarten and first grade. As students complete activities within the educational software, their proficiency is assessed and used to assign the next activity module. Teachers can monitor student progress on a dashboard that displays each student's activity module completions.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

FIG. 1 illustrates an example of a system 100 for providing users with individualized computer-based interactive activity modules. Briefly, the example system 100 includes one or more computing devices 105, 106, and 107 that communicate with a server 110. One or more users, students 115, 116, and 117, participate in activity modules 135, 136, and 137 according to the students' classifications 125, 126, and 127. A teacher 130 monitors student progress using a teacher dashboard 134 presented on a computing device. The teacher dashboard 134 displays information for students who are in the same school grade and class. In this example, the students 115, 116, and 117 have recently started first grade.

In more detail, an example server 110 may include a web server configured to provide a web-based application that provides interactive educational tools for students 115, 116, and 117 to use on computing devices 105, in or out of a classroom. In some implementations, the server 110 can include static web files that access discrete web services. The web-based application could, instead, be a standalone native application such as can be found on a tablet, smart phone, laptop computer, desktop computer, or another similar computing device. The server 110 contains an activity module graph, or learning map, of educational skills appropriate for the age and/or school grade range of the students.

Students are assigned activity modules based on their classifications 125, 126, and 127. To assign classifications, student data are used to classify students as at, below, or above grade level expectations. These classifications are then used to place students at different points in a learning progression.

Student classifications 125, 126, and 127 may be labels that are based on school grade and time of year. The time of year can be identified relative to a typical school year. In the example of FIG. 1, the first three alphanumeric characters of the classifications 125, 126, and 127 labels indicate the time of year. Labels include beginning of the year (BOY), middle of the year (MOY), and end of the year (EOY). The fourth alphanumeric character indicates a grade level, such as kindergarten (K), first grade (1), and second grade (2).

For example, if a student is starting kindergarten, and is evaluated at grade level expectations, the student's assigned classification is "BOYK." If that same student is evaluated above grade level expectations, the student's assigned classification may be "MOYK" or "EOYK."

Likewise, if a student is in the middle of first grade, and is evaluated at grade level expectations, the student's assigned classification is "MOY1." If that same student is evaluated below grade level expectations, the student's assigned classification may be "BOY1" or "EOYK."

When using the educational software, students 115, 116, and 117 participate in interactive activity modules 135, 136, and 137 on computing devices 105, 106, and 107. The computing devices can be, for example, laptops, tablets, desktop computers, or smart phones. The computing devices can be used individually by students, so that each student can proceed at his or her own pace through the activity modules.

An interactive activity module may be a stimulus or question to which students are expected to provide a response. An example activity module involves counting the syllables in a spoken word. In the example in FIG. 1, the screen on each computing device 105, 106, and 107 displays a train on a set of train tracks. The train tracks are overlaid with a grid. The activity module provides the sounds of a spoken word through the speakers of the computing devices 105, 106, and 107 and instructs the students 115, 116, and 117 to count the syllables in the word. The students 115, 116, and 117 are instructed to click on the number of grid spaces that corresponds with the number of syllables in the word, in order to advance the train. For example, if the spoken word has two syllables, such as "bookshelf," the student is expected to click on two grid spaces. The train on the screen then advances two spaces.

In the example in FIG. 1, student 115 has been evaluated below grade level expectations and assigned a classification 125 of MOYK, based on the student's 115 previous interactions with the system 100 and/or on any third-party assessments. Since student 115 has recently started first grade, his or her skill level is slightly lower than expected. Therefore, the interactive activity module 135 that student 115 performs is slightly simpler than the activity modules assigned to students 116 and 117.

Student 116 has been evaluated at grade level expectations and assigned a classification 126 of BOY1, based on the student's 116 previous interactions with the system 100 and/or on any third-party assessments. Since student 116 has recently started first grade, his or her skill level is at the expected level. Therefore, the interactive activity module 136 that student 116 performs is slightly more advanced than the activity modules assigned to student 115.

Student 117 has been evaluated above grade level expectations and assigned a classification 127 of MOY1, based on the student's 117 previous interactions with the system 100 and/or on any third-party assessments. Since student 117 has recently started first grade, his or her skill level is slightly higher than expected. Therefore, the interactive activity module 137 that student 117 performs is more advanced than the activity modules assigned to students 115 and 116.

Student 115 is presented with the spoken word "bookshelf," a two-syllable word. Student 116 is presented with a three-syllable word, "headquarter," while student 117 is presented with a four-syllable word, "estimation." The students proceed through the activity modules at their own paces. Student 117 has nearly completed the activity module, as shown by the train in activity module 137 nearing the end of the train track. Students 115 and 116 are proceeding at slower paces through their activity modules, as shown by the trains in activity modules 135 and 136 being closer to the beginning of the train track.

In another example activity module, students are asked to count phonemes in a word. Student 116, at a classification 126 of BOY1, may be presented with the word "man," while student 117, at a classification 127 of MOY1, is presented with the word "drums." Both students 116 and 117 have the same experience with the activity module and learn the same skill. However, each student is challenged at his or her individual skill level.

If the student provides an incorrect response to an inquiry, for instance by clicking on the wrong number of grid spaces on the train track, the computing device makes a sound indicating that the answer is incorrect. The activity module gives the student an opportunity to try again, and may provide a hint. If a student repeatedly provides an incorrect response, the activity module can provide more detailed hints and instructions until the student selects the correct response. If a student selects multiple incorrect responses during the course of an activity module, the educational software can terminate the activity module.

A student exits an activity module either when the student has successfully completed the activity module or when the activity module has terminated due to numerous incorrect responses. When a student 115, 116, or 117 exits the interactive activity module 135, 136, or 137, the computing device 105, 106, or 107 sends the interaction data to the server 110. The interaction data can include, for example, the amount of time a student spent on the activity module, the number of attempts a student made before selecting the correct answer, and the incorrect answers that the student selected. The server 110 receives the interaction data of the activity module and uses an adaptive algorithm to determine the appropriate next activity module for each student 115, 116, and 117 within the learning map.

The interaction data of activity module 135 may show that student 115 took a long time to complete activity module 135, and selected many incorrect responses. The algorithm may determine that the student 115 should move back to a previous activity module in order to acquire more basic skills. In this case, the educational software blocks student 115 from accessing activity module 135 until student 115 has mastered the prerequisite skills necessary for the activity module. The educational software may reclassify the student 115 for the skill of counting syllables, for example by reassigning student 115 with a classification of BOYK instead of MOYK. Once the algorithm selects the appropriate level, the activity module options are presented to the student 115 through the graphical interface of the computing device 105.

The interaction data of activity module 136 may show that the student 116 proceeded at a moderate pace through the activity module 136, and that the student 116 selected several incorrect responses. The algorithm may determine that student 116 should repeat the activity module 136 at the same level to improve proficiency before moving on to a more advanced level. Once the algorithm selects the appropriate activity module, the activity module options are presented to the student 116 through the graphical interface of the computing device 106. When repeating an activity module, the appearance and format of the activity module may remain the same, while the content, such as the provided words and/or the order of words, can be slightly different each time.

The interaction data of the activity module 137 algorithm may show that student 117 quickly completed the activity module 137 with very few mistakes. The algorithm may determine that student 117 should advance to an activity module that corresponds to the next skill on the learning map.

When the server 110 receives the interaction data of the activity modules, the server 110 displays the interaction data of the activity modules on the teacher dashboard 134. The teacher 130 can monitor each student's progress on the dashboard 134. The dashboard 134 can be displayed on a computing device such as a laptop, tablet, desktop computer, or smart phone.

The educational software is available to students both in and out of the classroom. Students can use the educational software at home, by connecting their computing device 105 to the server 110 through the internet. Students who do not have access to the internet outside of school have the option of downloading activity modules to perform outside of school. For example, a teacher 130 may assign an educational software activity module for homework. The students 115, 116, and 117 may download those activity modules while at school so that they can be accessed at a later time when not connected to the internet. When the students 115, 116, and 117 return to school and connect their computing devices 105, 106, and 107 to the server 110, the student's interaction data appear on the teacher dashboard 134.

The educational software system can provide teachers with recommendations on the skills that their students need assistance on. The system can evaluate data for the students in the class and recommend instruction. For example, if a class of students is reaching the end of the first grade year, most of the students should be at the EOY1 level. There may be some skills for which most students are at the MOY1 or BOY1 level. The educational software system can make instruction recommendations to the teacher to instruct the students on those particular skills. Instruction recommendations can be tailored to individual schools or teachers. For example, a teacher may set a threshold within the system so that when 50% of the students are behind the expected level for a certain skill, the system suggests an instructional activity module on that skill.

Classifications may be determined from learning standards such as state or federal learning standards. Some skill levels relate to a student's ability to isolate and pronounce phonemes, or sounds, within words. An example learning standard for kindergarten is the ability to isolate and pronounce the initial phoneme, medial vowel phoneme, and final phoneme in three-phoneme words. The educational software can use this standard to assign activity modules appropriate to BOYK, MOYK, and EOYK classifications. At the BOYK level, a kindergarten student may be asked to isolate and pronounce the initial sound of a word like "cat." At the MOYK level, a kindergarten student may be given a word with consonant combinations like "crab." At the EOYK level, a kindergarten student may be given a word with both consonant and vowel combinations like "snail," and would be asked to isolate and pronounce all of the phonemes in the word. In this way, a learning standard can be used to develop personalized activity modules appropriate for a student's skill level.

As a student participates in interactive activity modules, the educational software adjusts based on the displayed proficiency of the student. For example, if a student has an initial classification of BOY1 and struggles with the certain assigned activity modules, the system can adjust the student to a level of EOYK for the related skills so that the student can gain proficiency before proceeding with more difficult activity modules. The system can then prevent the student from accessing activity modules at a level of BOY1 until the student has mastered skills at the prerequisite level of EOYK.

Though the individual student activity modules are tailored to each student's skill levels, the stories and characters are the same for all students. Students progress through the educational software by performing "quests." A quest is typically a story in which a character needs help to solve a problem. Students complete multiple "quest steps" to gain energy to help the character. There are multiple activity modules within each quest step.

Students at various skill levels, typically within the same class and grade, perform the same quests. For example, in one quest that is common for all students regardless of classification, a character named Sam is trying to learn to play the flute. He is having difficulty and needs help from the student. The student can perform several quest steps, such as "All Aboard!" to gain energy to help Sam by correctly counting word syllables. Within the quest step "All Aboard!" a student performs several activity modules related to counting word syllables.

When performing activity modules within the quest step "All Aboard!," each student sees a train on a set of train tracks. Each student clicks on grids to advance the train, based on the number of syllables in the spoken word. However, the words used for the activity module vary from student to student. For example, a student at a level of MOYK may be asked to count syllables for 1 and 2 syllable words. At the same time, a student at a level of BOY1 may be asked to count syllables for 2 and 3 syllable words, while a student at a level of MOY1 may be asked to count syllables for 3 and 4 syllable words. Students must successfully perform several activity modules within the quest step in order to complete the quest step.

In the example of an activity module that asks students to count phonemes in a word, the lengths of the words can vary according to classification level. For example, a student at a level of MOYK may be asked to count phonemes in 3 or 4 letter words. At the same time, a student at a level of BOY1 may be asked to count phonemes in 4 or 5 letter words, while a student at a level of MOY1 may be asked to count phonemes in 5 or 6 letter words.

If two students perform the same quest, the two screens appear similar to each other, though the content of the activity modules varies according to each student's classification. In this way, a student cannot identify if he or she is ahead of or behind his or her classmates by looking at other screens in the classroom. Students can discuss the quests with each other and have a shared experience, while receiving tailored activity modules based on their skill levels.

The educational software system maintains a profile for each student. The profile initially incorporates information regarding the student's age and school grade, as well as any input from external sources such as teachers, administrators, parents, or third party assessments. The system receives the initial information and generates preliminary classifications for the student. As a student participates in interactive activity modules, the student's profile continually updates based on the system algorithm.

If a student takes a long time to complete certain tasks and/or routinely selects incorrect responses, the system can move the student back to more basic activity modules. This may occur if a student is assigned a classification that is more advanced than his or her actual abilities. For example, if a student is in the beginning of first grade, he or she may be assigned an initial classification of BOY1. However, the student's ability to blend sounds into words may be at the MOYK level. The student may struggle with the assigned blending activity module. In this case, the educational software recognizes that the student is struggling at the BOY1 level. The educational software then blocks the student from accessing the BOY1 level activity modules for blending, and instead assigns activity modules at the MOYK level. Referencing the learning map, the educational software also blocks the student from accessing any activity modules for which BOY1 blending skills are a prerequisite.

If a student is proceeding quickly through the activity modules and selecting correct responses, the system can advance the student to more challenging activity modules. This may occur if a student is assigned a classification that is less advanced than his or her actual abilities. For example, if a student is in the beginning of first grade, he or she may be assigned an initial classification of BOY1. However, the student's ability to identify blending sounds into words may be at the MOY1 level. The student may easily and quickly complete the assigned blending activity module. In this case, the educational software recognizes that the student is easily completing the BOY1 level. The educational software then assigns activity modules at the MOY1 level. Referencing the learning map, the educational software also grants the student access to activity modules for which BOY1 blending skills are a prerequisite.

The student profiles can be updated rapidly so that students who actively use the educational software can quickly proceed from one activity module to another without experiencing a delay while the software determines the next activity module.

A student's classification may be different for various skills. For example, a student may be at a level of MOY1 for counting the syllables of spoken words, but may be at a level of MOYK for identifying the main idea of the story. The server can use the learning map and student profiles to identify and track the level of each student for various skills.

To generate student profiles and update them with skill level data to assign appropriate activity modules, the educational software system has an algorithm that is designed to perform the following functions. Firstly, the algorithm models a student's underlying competencies in various subjects, and the relationships between the competencies. Secondly, the algorithm uses data on student behaviors to quantitatively evaluate a student's competencies. Thirdly, the algorithm uses statistical inference to infer student competencies from student data. The algorithm receives new or changed student data in near-real-time, and uses the data to make additional inferences on student competency. Student profiles are maintained in a production-grade, scalable system for storage and retrieval.

Figure 2:
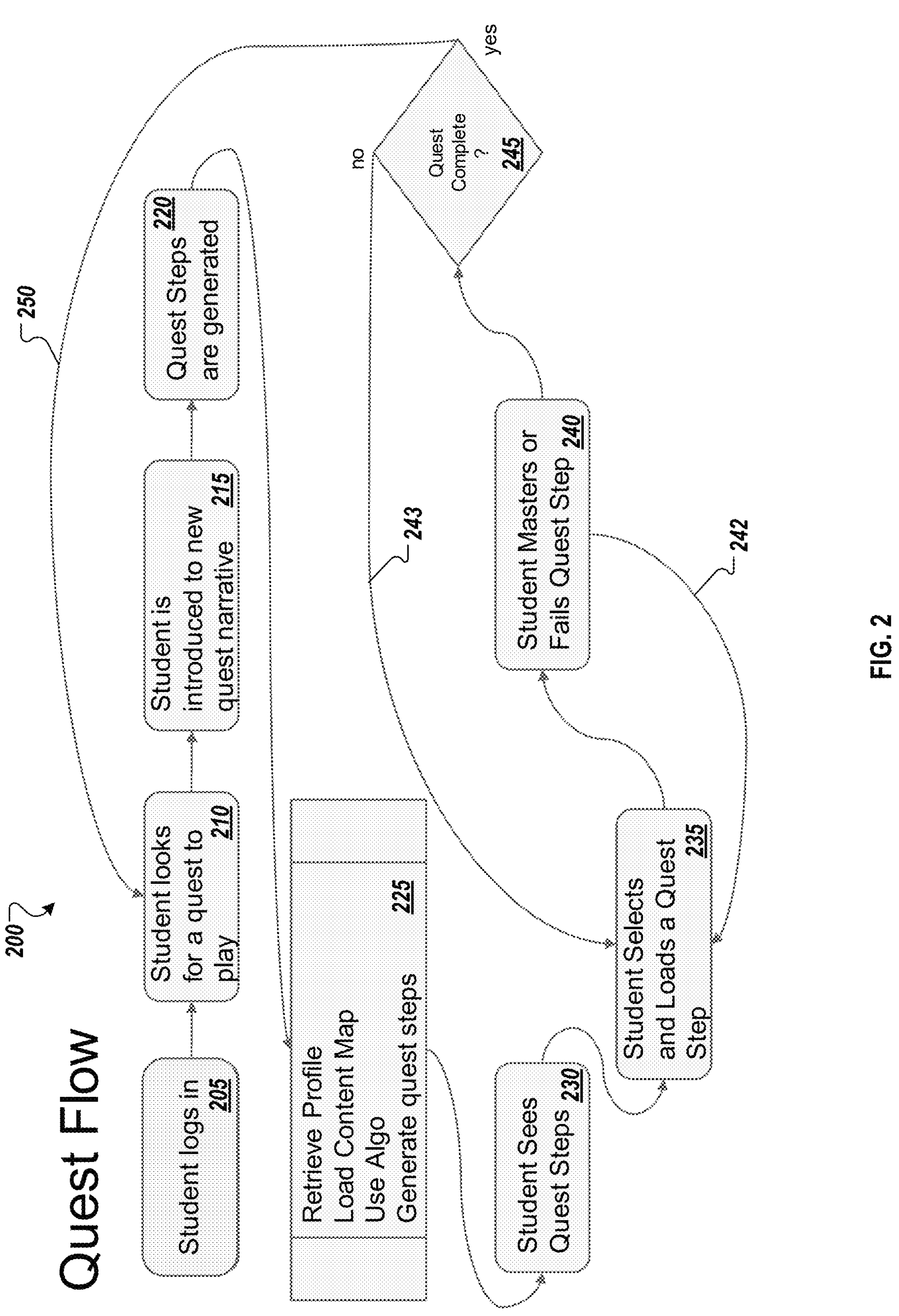
FIG. 2 is a block diagram showing an example flow of interactive student quests.

FIG. 2 is a block diagram showing the flow 200 of interactive student quests. Quests are assembled by the algorithm using the learning map. Each quest has a theme. For example, in the quest "A Giant Problem," students gain energy by completing a number of quest steps. The energy is used to help a restaurant owner find ingredients for a recipe.

Each quest has multiple quest steps to be completed by the student. A quest step represents the serving of content based on progress through the learning map. Each quest step focuses on a particular skill.

Progress through the learning map is determined by an adaptive algorithm. When students successfully master quest steps, the algorithm references the learning map to determine the next quest step to provide to the student. Once a student completes the quest steps within a quest, the quest is complete. In one school year, a student is expected to complete a "season" of quests within the educational software. An example season of the educational software includes 24 quests.

In the example in FIG. 2, a student logs in to the educational software on a computing device (205). The student then looks for a quest to play within the system (210). Some example quests are "Carrot is Lost!" and "Garry's Sore Throat." In an example quest, the student is introduced to one or more characters that need help to solve a problem. The student completes quest steps in order to gain energy to help the characters. The available quests may be the same for all students in a class.

Once a student selects a quest, the student is introduced to a new quest narrative (215). The student meets the characters and learns about their problem. In an example quest, the student meets a character named Sam who is trying to learn to play the flute. Sam is having difficulty and needs the student's help. The student is encouraged to perform several quest steps to gain energy in order to help Sam.

The quest steps are then generated (220). To generate the appropriate quest steps, the system retrieves the student's profile, accesses the learning map, and uses the algorithm to generate quest steps specific to the student (225). Each quest step equates to a skill on the learning map. The sequence of the quest narrative may be fixed, but the activity modules selected for the quest steps depend on the classification of the individual student.

Once the quest steps are generated, the student sees the quest steps (230) on the screen of the computing device. While different quest steps cover different skills, each activity module within a quest step can cover the same skill or different skills for each student. The student has several quest steps to choose from. One example of a quest step is "Zoom Boom," which includes rhyming activity modules. In this quest step, students are asked to select pictures that represent words that rhyme with a spoken word. For example, an activity module may present a picture of a dog and may speak the word "dog." The student is then presented with pictures of a mouse, a key, and a frog. The student can successfully complete the task by clicking on the picture of the frog to indicate that "frog" rhymes with "dog."

Another example of a quest step is "Wordbots," which includes activity modules for segmenting words into sounds. In this quest step, the graphical interface displays a picture of an object, such as a stoop. The student clicks on wordbots that produce beginning sounds and on wordbots that produce end sounds. The student then drags the wordbots together to produce the word represented by the picture. To successfully complete the task of producing the word "stoop," the student drags together the wordbot that makes the "st" sound and the wordbot that makes the "oop" sound.

Another example of a quest step is "What's the Big Idea," which includes activity modules for identifying the main idea of a story. In this quest step, students are presented with an image. For example, the image may be of a child wearing a helmet sitting on a sidewalk next to an overturned bike. The child has a scrape on her knee. The student is instructed to select the main idea of the image from a list of options. The main idea for this image is "The girl fell off her bike." An example of an incorrect response is "The girl is wearing a helmet." This quest step teaches students to evaluate the main idea rather than the details of an image.

The student participates in the quest step and either masters or fails the quest step (240). If the student fails a quest step, the student may repeat the quest step (242). If the student masters a quest step, but has not yet completed the quest, the student can select another quest step to complete (243). If the student masters all quest steps, then the quest is complete (245). The student can then select additional quests to play (250).

While all students in a classroom may have access to the same quests and have a shared experience, the content is based on the students' individual progress through the learning map. The free floating structure allows for similar thematic and narrative experiences among students, while the focus is on building learning skills that are personalized to each student. Additionally, each student is able to proceed at his or her own pace while progressing through the activity modules within the quest steps.

The personalized activity modules can vary in multiple ways. For example, if one student is participating in an activity module at level BOY1 while another student participates in the same activity module at level MOY1, the activity modules can vary in the following ways. The BOY1 activity modules may proceed at a slower pace and include more instruction compared to the MOY1 activity modules. The MOY1 activity modules may also include more challenging content and include multiple step problems. A student at a classification level of BOY1 for a certain skill is prevented from accessing activity modules at a level of MOY1 for that skill. Additionally, the student is prevented from accessing activity modules that require a MOY1 level as a prerequisite. In this way, students master foundational skills before having access to activity modules for more advanced skills.

Figure 3:
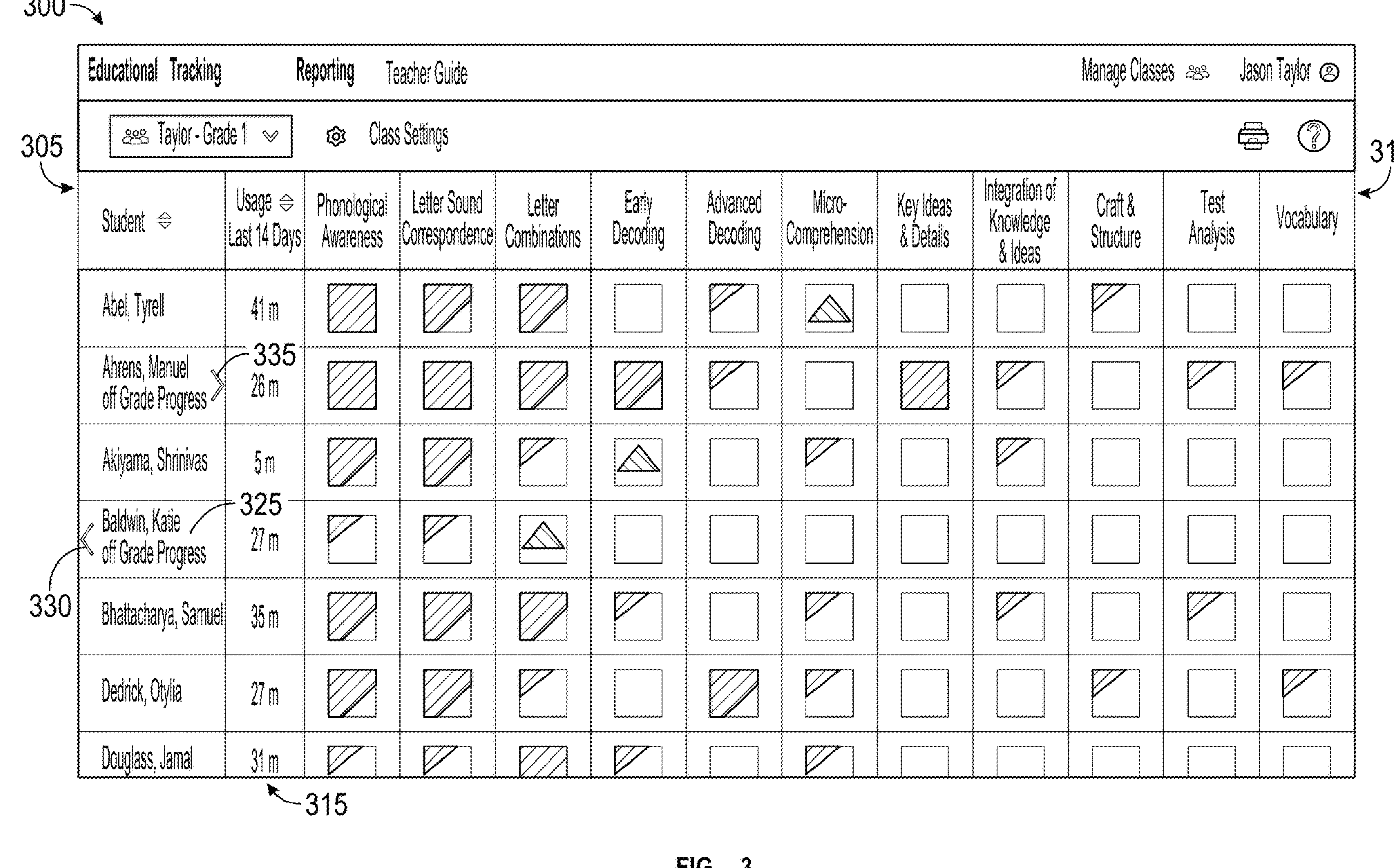
FIG. 3 is an example of a teacher dashboard showing the progress of students within a class, including indications that several students are making "off-grade progress."

FIG. 3 is an example of a teacher dashboard 300 showing the progress of students within a class. The teacher dashboard 300 is a default "Class View," and shows a view of students in a given teacher's class. The students' names 305 are listed on the left side of the graphical interface, while the skills 310 are listed across the top of the graphical interface. There is a usage column 315 that shows the teacher how much time each student has spent logged in within the last 14 days. A grid of squares shows each student's progress through each skill. Symbols within the grid can indicate that a student has completed a task, is working on a task, or is stuck on a task. Additional detail regarding the grid symbols is provided in FIG. 4.

In the example of FIG. 3, the names of two students include the "off-grade progress" label 325. "Off-grade progress" indicates that the student is working on skills that are more than one year ahead or behind their placement within the educational software. A student's off-grade progress is determined by comparing their initial placement to the school grade and time of year for each of the skills the student is currently working on.

Off-grade progress can be indicated on the teacher dashboard 300 by the word "off-grade progress, and an arrow pointing left for below-grade, or right for above-grade. Alternatively, a color-coding system can be used, with one color indicating below-grade, and another color indicating above-grade.

If a student is initially placed at BOY1, this is the reference point for off-grade progress. Any skills progress outside of 1 year from that time of year is considered off-grade progress. Any skills progress in between EOYK and MOY1 is considered on-grade progress. The option for the teacher to view off-grade progress only appears if the student has begun working on a skill that is associated with placements outside of this one year span from their initial placement. If a skill is in progress and has a placement outside of one year from a student's initial placement then this skill is considered an off-grade skill for the student.

In the example of FIG. 3, if the teacher clicks on the left arrow 330 next to Katie Baldwin's name, the teacher will view a graphical interface displaying a student list view based on progress in different times of year for that student. In this case, Katie Baldwin is working on one or more skills that are at least one year behind her initial placement. Since Katie Baldwin was initially placed in first grade (MOY1), opening the student detail view by clicking on the left arrow 330 will show Katie's progression in skills applicable to kindergarten content.

If the teacher clicks on the right arrow 335 next to Manuel Ahrens' name, the teacher will view a screen displaying a student list view based on progress in different times of year for that student. In this case, Manuel Ahrens is working on one or more skills that are at least one year ahead of his initial placement. Since Manuel Ahrens was initially placed in first grade (MOY1), opening the student detail view by clicking on the right arrow 335 will show Manuel's progression in skills applicable to second grade content.

Although FIG. 3 shows a teacher dashboard of students who are all in first grade, the display can be set up to show students in different school grade. For example, in a before- or after-school program, there may be students from kindergarten, first grade, and second grade within a classroom. A teacher dashboard can be set up so that a teacher can view a dashboard for all students, regardless of school grade.

Figure 4:
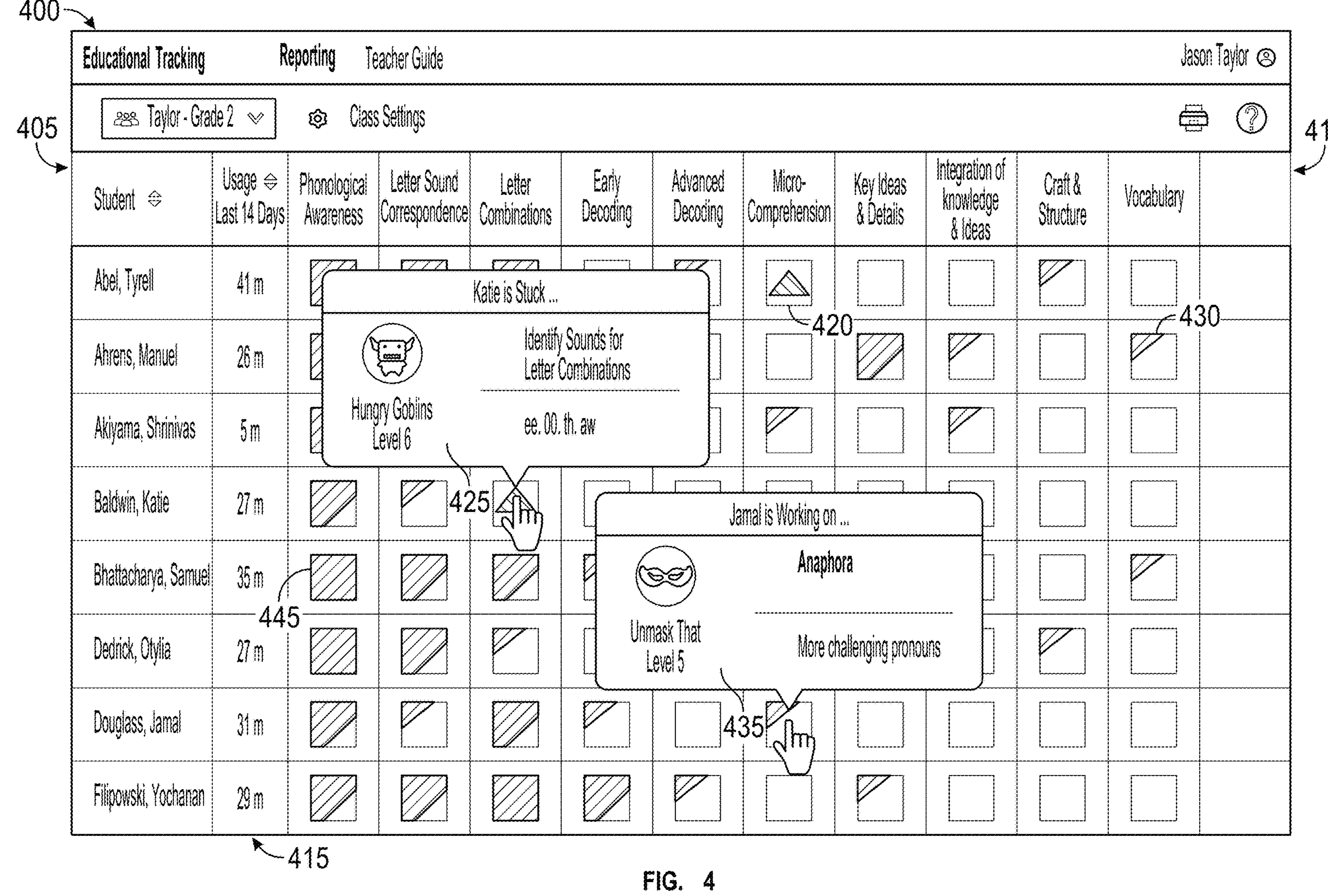
FIG. 4 is an example of a teacher dashboard showing the progress of students within a class, including indications that several students are "stuck."

FIG. 4 is an example of a teacher dashboard 400 showing the progress of students within a class, including indications that several students are "stuck" on skills. The students' names 405 are listed on the left side of the graphical interface, while the skills 410 are listed across the top of the graphical interface. There is a usage column 415 that shows the teacher how much time each student has spent logged in within the last 14 days. A grid of squares shows each student's progress through each skill. Symbols within the grid can indicate that a student has completed a task, has been placed out of a task, is working on a task, or is stuck on a task.

In the example in FIG. 4, no names of students include the "off-grade progress" label or color. However, the rows next to several students' names indicate "stuckness" on various skills. Stuckness is indicated by a triangle 420 within the grid, aligning horizontally with the student's name and vertically with the skill that the student is stuck on. When a student is presented with a skill challenge, the student may be allowed a certain number of attempts. If the student fails to succeed at the challenge within the allowed attempts, the teacher dashboard 400 indicates that the student is stuck by displaying a triangle 420.

In the example of FIG. 4, the teacher hovers the computer mouse over or taps the triangle next to Katie Baldwin's name. An information bubble 425 opens, informing the teacher that Katie Baldwin is stuck on an activity module for identifying sounds for letter combinations within the quest step "Hangry Goblins." Specifically, Katie is stuck on identifying sounds for the letter combinations "ee," "oo," "th," and "aw." The educational software references the algorithm to determine the next appropriate activity module for Katie. The educational software prevents Katie from accessing any activity module that requires mastery of the skill on which she is stuck. The educational software can also prevent Katie from re-accessing the activity module within the quest step "Hangry Goblins" that she became stuck on. The educational software can grant access to these activity modules after Katie masters the prerequisite skills.

Students may be stuck for several reasons. One potential reason is that a student is stuck because the student is lacking prior skills. The new skill may be dependent on one or more prior skills that are lacking. This concept is called "demastery." The educational software can recognize demastery and tie the new skill on which the student is stuck to prior skills that the student has not mastered. This information can be provided to the teacher, along with an instruction recommendation, so that the teacher can help the student master the prior skill.

When the educational software recognizes demastery, it can recognize the fundamental skills that are missing. In some implementations, the system can identify the fundamental skills on the learning map that the student has not mastered. The algorithm can then choose quest steps related to the demastered skills, and present those steps to the student. For example, Katie is stuck on identifying sounds for letter combinations. This may be due to demastered skills related to identifying individual letter sounds. The algorithm can reassign Katie to a lower classification for the skill of identifying letter sounds. The educational software can then grant Katie access to activity modules that cover the foundational skills, while preventing access to activity modules that cover more advanced skills.

In the example in FIG. 4, many students are shown as "working on" certain skills. When a student has begun a quest step on a certain skill, but has not yet completed the quest step, the grid displays a partially shaded square 430. In the example of FIG. 4, the teacher hovers the computer mouse over or taps on a partially shaded square 430 next to Jamal Douglass' name. An information bubble 435 opens, informing the teacher that Jamal Douglass is working on an activity module related to anaphora, specifically pronouns, within the quest step "Unmask That." If Jamal takes more than the allowed number of attempts to get through an activity module, Jamal becomes stuck on that activity module, and a triangle 420 replaces the partially shaded square 430 in the associated square. If Jamal successfully completes the activity module, the partially shaded square 430 becomes a fully shaded square 445, indicating mastery of the activity module.

Color coding can be used on the teacher dashboard 400 to help the teacher identify students who are stuck on certain skills. For example, green can be used for partially shaded squares 430 or fully shaded squares 445, while red can be used for triangles 420 to indicate stuckness. Color coding can help a teacher quickly identify students who may need assistance and/or instruction by looking at the teacher dashboard 400.

A student's initial classification may be determined or adjusted based on external information. For example, if a teacher knows that a certain kindergarten student at the beginning of the year is generally at the skill level of a typical kindergarten student at the end of the year, the teacher can assign the student an initial classification of EOYK instead of BOYK. Additionally, third party information may be used to determine a student's classification. Standardized test results may help to identify skill levels of students. If a student beginning first grade takes a standardized test and the results indicate that the student's skills are at a second grade level, the results can be used to establish the student's initial classification at BOY2 instead of BOY1. In some cases, the classification can be adjusted by a teacher or administrator who sees the results of the standardized test scores and manually changes the classification in the educational software. In other cases, the educational software may receive the standardized test results and automatically adjust the student's classification based on the assessment scores.

Figure 5:
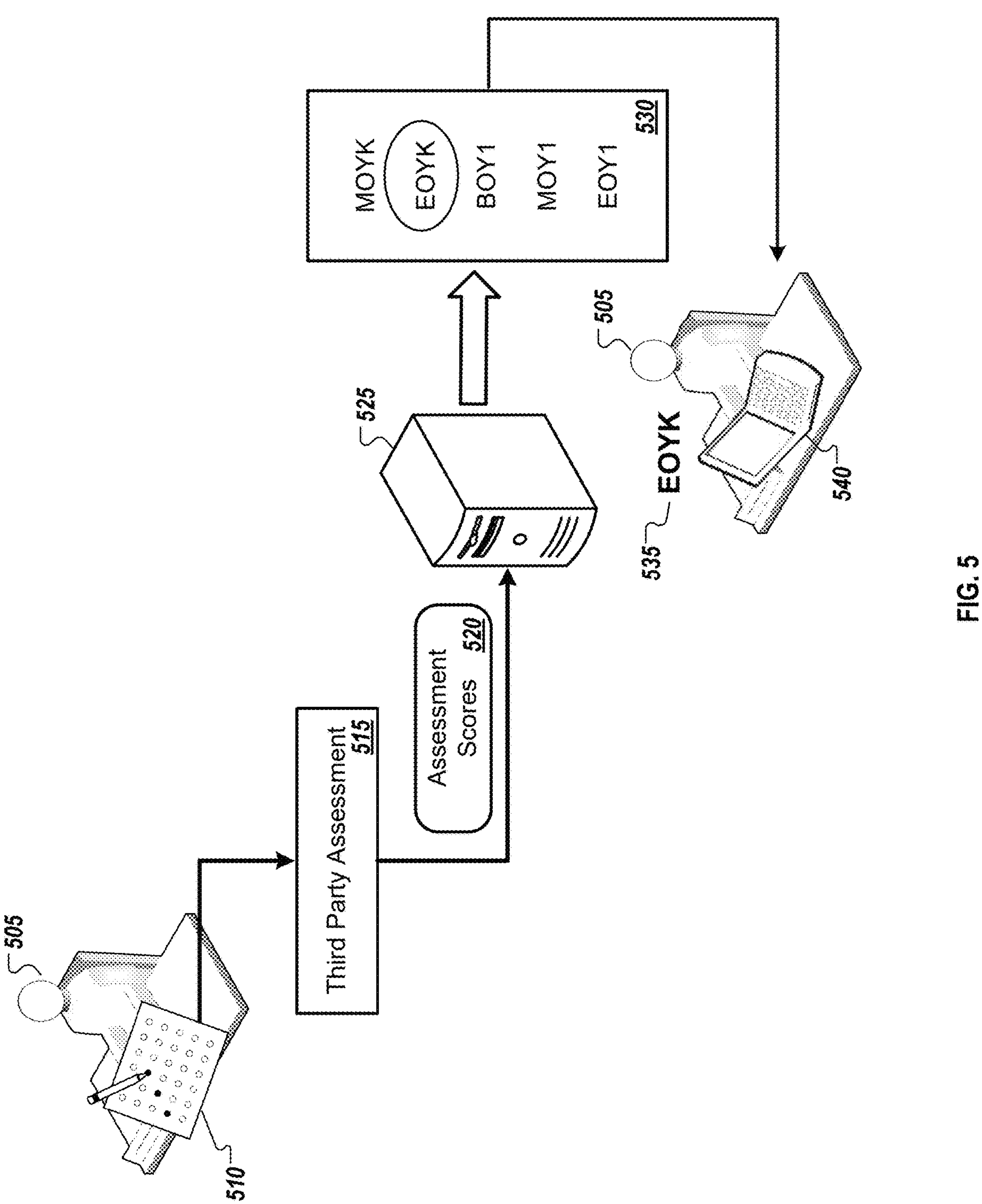
FIG. 5 is a diagram showing an example use of third-party assessments to determine student classification.

FIG. 5 is a diagram showing the use of third-party assessment data to help determine student classification placement. Third party assessment data, such as the results of student testing, can be fed to the educational software algorithm to help identify the appropriate classification for students.

In the example of FIG. 5, a student 505 takes an assessment 510. The assessment can be taken in school or outside of school. The assessment can be used to evaluate the student's proficiency on a variety of skills. The assessment is evaluated by a third party 515. The third party can be, for example, a private organization that performs student testing and evaluation. The third party can also be, for example, a local, state, or federal government organization that performs student testing and evaluation. The student's assessment data 520 are sent to the educational software server 525.

The educational software algorithm analyzes the third party assessment data 520 and correlates the assessment data 520 with the classifications 530. Based on the identified classification 535, the educational software then grants the student 505 access to appropriate activity modules through the graphical interface on the computing device 540.

Various third-party assessments can have different grading scales. For example, a certain assessment may evaluate students on a scale from 1 to 100, while another assessment evaluates students on a scale from 1 to 20. The educational software algorithm analyzes the assessment data and assigns classifications 530 for each skill on which the student was assessed. The algorithm may be configured so that a first grade student who achieves a score of 70 out of 100 on a certain assessment is classified BOY1, while a first grade student who achieves a score of 80 out of 100 is classified as MOY1. On a different assessment, the algorithm may be configured so that 14 out of 20 correlates to BOY1, while 16 out of 20 correlates to MOY1.

Third-party assessment data can be used to reclassify a student. For example, if a student is initially classified as BOY1, but achieves 80 out of 100 on an assessment, the algorithm may reclassify the student as MOY1 for the skills that were tested on the assessment. The student can then skip forward on the learning map to more challenging activity modules.

Figure 6:
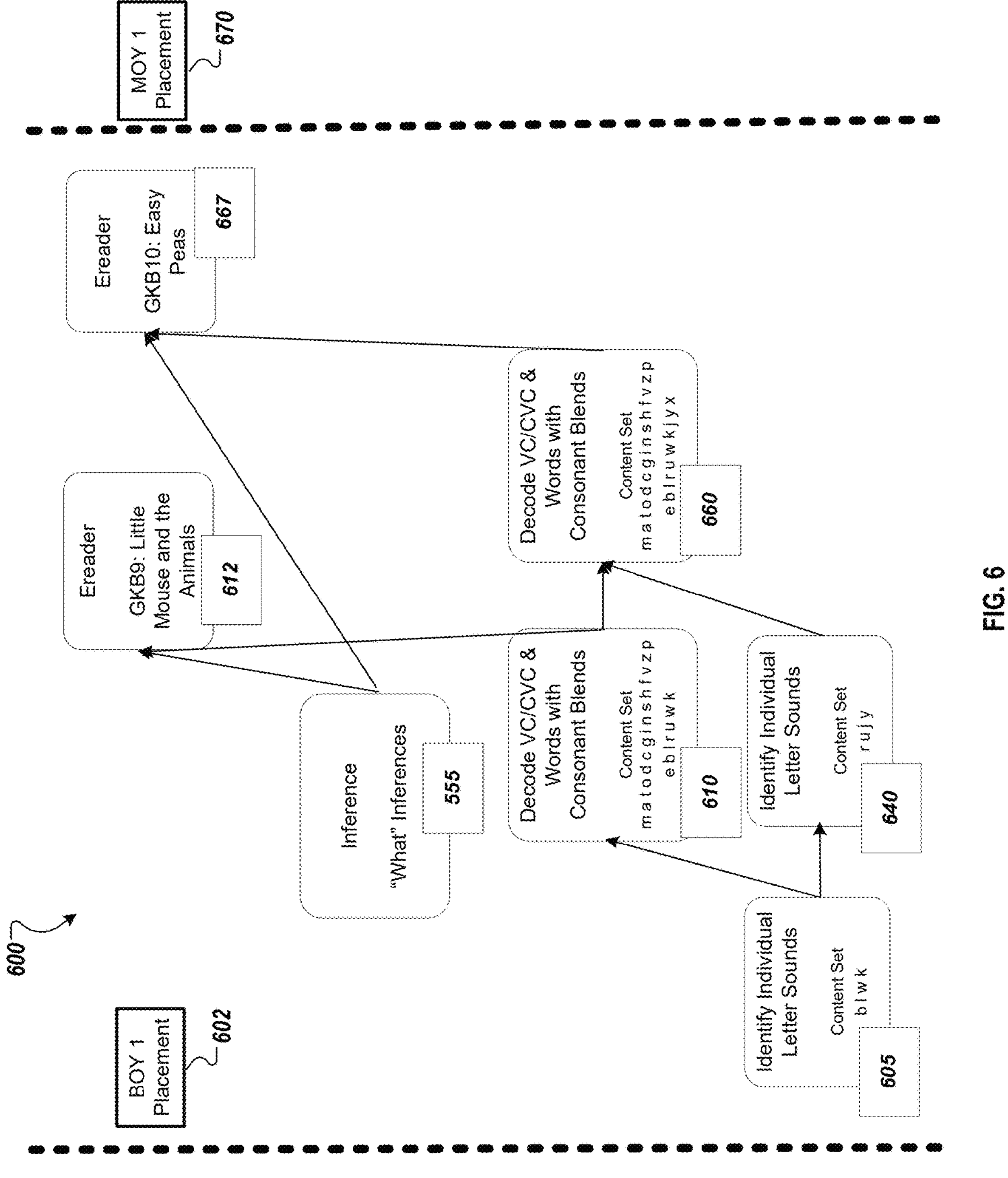
FIG. 6 is a section of an example learning map showing skill ranking and connections with electronic books.

FIG. 6 illustrates an example segment 600 of a learning map for generating and displaying one or more interactive tools for evaluating, planning, and reporting activities undertaken by students and/or teachers. For example, a learning map may represent various learning objectives that are to be obtained by students, and a relationship among those learning objectives (e.g., a progression of the learning objectives). In general, a learning map may be composed of a plurality of cells, with each cell corresponding to a learning objective. The plurality of cells may be arranged in a manner that reflects a relationship between the learning objectives corresponding to the cells. Each learning objective may encompass, for example, one or more skills (e.g., things that students need to be able to do), one or more concepts (e.g., things students need to understand), and/or one or more facts (e.g., things students need to memorize).

Certain learning skills are foundations for others. Dependent and subsequent skills are built into the learning map. The learning map demonstrates which skills are needed as a foundation for other skills. The learning map may be the same for all students, however each student's path through the map is unique. Students may begin on a certain node of the map and proceed forward or backward depending on his or her progress through the activity modules. Additionally, as a student's skill levels are adjusted, the student may jump to another segment of the learning map.

If a student struggles with a certain skill, the skill map can direct the system to a more basic foundation skill that will help the student progress. The algorithm can also consider teacher guidance. For example, if a teacher requests that a student perform additional activity modules related to a certain skill, the system can make the activity modules related to that skill available to the student.

The segment 600 of the learning map illustrated in FIG. 6 illustrates skill ranking. Each skill in the learning map is ranked by assigning a number to the skill. The rank ascends on the learning map from left to right. Moving from left to right through the learning map represents a student acquiring more skills. For example, the skill of identifying the individual letter sounds of "b," "1," "w," and "k" is assigned a rank of 605. The skill of identifying the individual letter sounds of "r," "u," "j," and "y" is further to the right, and assigned a rank of 640. A student is expected to master skill 605 before moving to the right to skill 640.

The time-of-year placements are also marked on the learning map. To the left of node 605 is a dotted line identified as "BOY 1 Placement" (602). Nodes to the left of the dotted line represent skills at the level of EOYK. Nodes to the right of the dotted line represent skills at the level of BOY1. Likewise, to the right of node 667 is a dotted line identified as "MOY 1 Placement" (670). Nodes to the right of the dotted line represent skills at the level MOY1. Therefore, nodes shown between the dotted lines in FIG. 6 are at the level of BOY1.

Rank is used as an extra "tie-breaker" value in the educational software system. When the algorithm gets to a point where a number of skill exercises are available to a student, the rank of the skill is used to determine which subset of skills is returned.

In the example in FIG. 6, when a student masters identifying the individual letter sounds of "b," "l," "w," and "k" (605), the student has activity modules available on at least two different skills. One available activity module is on the skill of decoding vowel-consonant (VC) and consonant-vowel-consonant (CVC) words with consonant blends (610). The second available activity module is on identifying the individual letter sounds of "r," "u," "j," and "y" (640).

Since the activity module on consonant blends is ranked 610, and the activity module on identifying individual letter sounds is ranked 640, the student is presented with the activity module on consonant blends first. Using rank for detailed subsets of skills ensures that a student is supplied with the lowest rank skill that they are ready for.

The segment of the learning map illustrated in FIG. 6 also illustrates skill connections with electronic books. The educational software can include electronic books. These books are configured to be read on computing devices such as laptops, smart phones, tablets, and other computing devices. The electronic books are included in the learning map.

The electronic books are linked to corresponding skills on the learning map. In the example in FIG. 6, electronic book "Little Mouse and the Animals" is assigned a rank of 612. There are two skills that map to this electronic book. The first skill is "what" inferences (555). The second skill is decoding VC/CVC and words with consonant blends (610). The learning map also shows that identifying individual letter sounds of "b," "l," "w," and "k" (605) should be mastered before attempting skill 610.

The educational software grants a student access to the electronic book "Little Mouse and the Animals" only after skills 555, 605, and 610 are mastered, because those skills are necessary for a student to be able to read and understand the electronic book. For example, the electronic book "Little Mouse and the Animals" may contain words like "shelf," "trap," and "flop," which contain consonant blends. If the student has not yet mastered these consonant blends, the student may struggle to read the electronic book.

The learning map does not grant a student access to the electronic book "Easy Peas" 667 until additional skills are mastered. In the example in FIG. 6, electronic book "Easy Peas" is assigned a rank of 667. Prerequisite skills for this electronic book are "what" inferences (555) and decoding CV/CVC and words with consonant blends (660), which is similar to skill 610 but with the added letters of "j," "y," and "x." The learning map also shows that skills 610 and 640 should be mastered before attempting skill 660, while skill 605 is a prerequisite for skills 610 and 640. The electronic book "Easy Peas" may include words such as "frothy," "flex," and "jump," which contain consonant blends as well as the new letters "j," "y," and "x." If the student has not yet mastered these letters, the student may struggle to read "Easy Peas." Thus, the educational software grants a student access to the electronic book "Easy Peas" only after skills 555, 605, 610, 640, and 660 are mastered, because those skills are necessary for a student to be able to read and understand the electronic book.

By linking electronic books to the skills in the learning map, the educational software ensures that a student is supplied with the lowest rank electronic book that the student is ready for. Additionally, by linking electronic books to skills in the learning map, the educational software provides students with opportunities to apply the skills that they have developed inactivity modules to reading books that are appropriate for their level.

The learning model and algorithm is adaptable over time. For example, if a new electronic book is written to teach or enhance certain skills on the learning map, the learning map can be adjusted to incorporate the new electronic book. Additionally, if, over time, certain activity modules are determined to be too simple or too complex, the activity modules can be adjusted or replaced with more suitable activity modules. The algorithm and learning map are updated periodically with new editions. The new editions can incorporate feedback from students, teachers, and administrators. The new editions can modify, add, or remove quests and/or quest steps. By updating the educational software with new editions, students who use the software over several years will continually have new experiences with the software.

Figure 7:
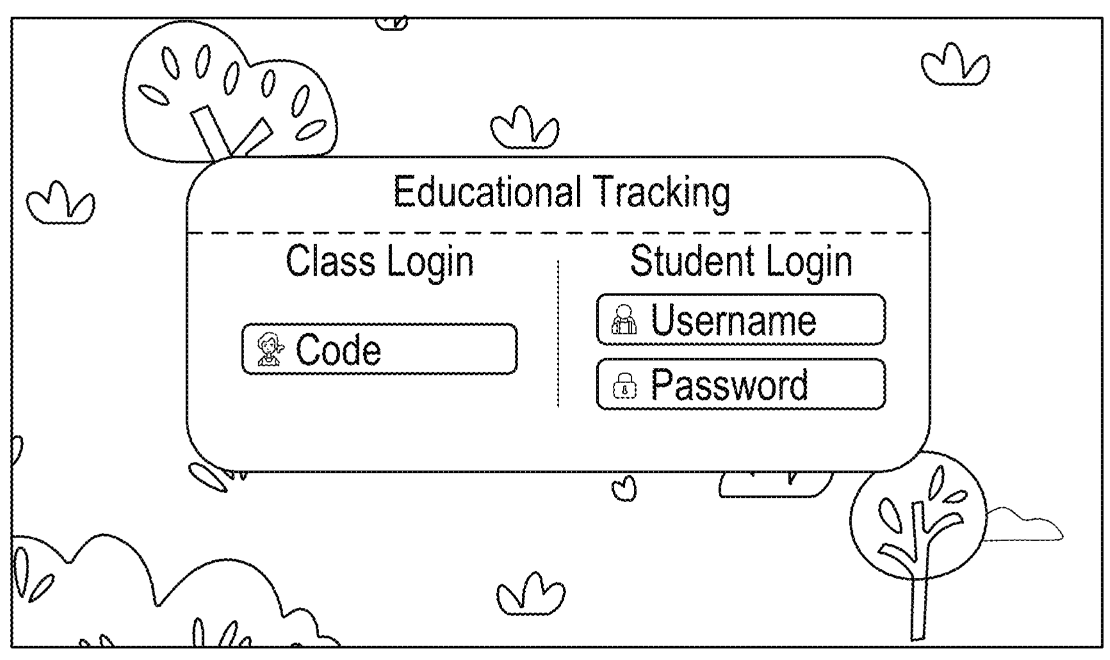
FIG. 7 is a screenshot of an example student login page.

FIG. 7 is a screenshot of an example student login page for the educational software. A student can log in to the software by entering account information, including a username and password. Students have the option to log in with student account information both in school and at home. Alternatively, a teacher can use a simple login by entering a unique class code into the "Class Login" block. The class code for simple login is also displayed in the teacher reporting dashboard for easy access. Each class code is unique to an individual class or other group. For example, there may be class code associated with a before- or after-school care group.

Figure 8:
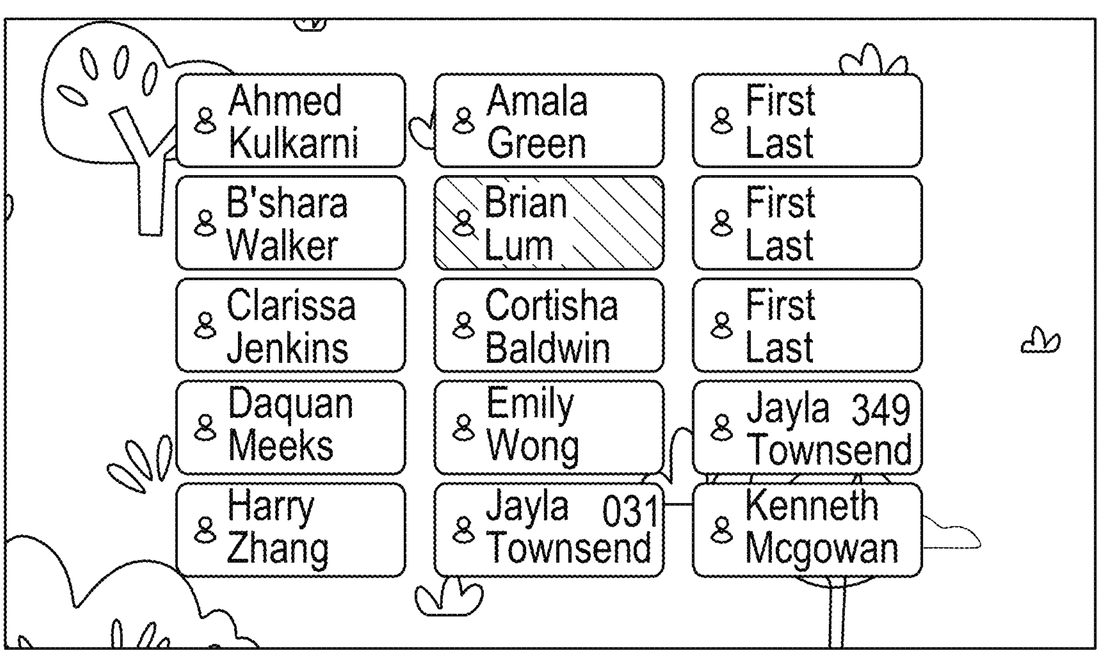
FIG. 8 is a screenshot of an example class login page.

FIG. 8 is a screenshot of an example class login page for the educational software. The class login displays lists of student names in the class. To enable access to the class login page, a teacher or administrator authorizes the use of class login with their credentials. The teacher or administrator performs the authorization on every computing device used for the educational software. This ensures that the class login on each computing device is only used for the unique class.

Once a computing device is logged in to the class login page, a student can click on his or her name to log in to the educational software. If more than one student has the same name, the last three digits of the students' identification numbers are appended to their last name. For example, in FIG. 8, there are two students named Jayla Townsend, therefore a three digit number is appended to their names. After a student chooses his or her name from the class list, the student is then logged in and can select a quest to perform. This method of logging in to the educational software makes it easy for a student to quickly log in and begin the assigned activity modules. The class login page represents an intermediate step between a student being logged in and logged off. The computing device is logged in to the class account, however the student is not yet logged in until the student clicks on his or her name.

FIG. 9 is a flow diagram showing an example method 900 for granting students access to activity modules. Briefly, the method 900 includes receiving data identifying the classification of a user (902), granting access to certain activity modules based on the user's classification (904), receiving interaction data based on the user's interaction with an activity module (906), determining that the interaction data indicates improper classification of the user (908), and based on the interaction data, granting access to an additional activity module while preventing the user from accessing a previously accessible activity module (910).

In more detail, the method 900 receives user data identifying a user, and classifying data indicating a classification of a user (902). The user may be, for example, a student in first grade. The classifying data may be identified by a specific school grade level and time of year, such as "beginning of the year, first grade," or BOY1. A student's classification may be determined by the school grade in which the student is enrolled. An additional classification may be an effective school grade of the student based on previous activity module interaction data.

A student's classification may also be based on analyzing assessment data that reflects progress of the user. Assessment data can be received from a written assessment. For example, the assessment data can come from a written exam, such as a standardized test. Assessment data can also be received from another user, such as a teacher. For example, a teacher may evaluate a student on certain skills, and input the results of the evaluation to determine the student's classification for those skills.

Based on the classification of a user, the method 900 grants the user access to a first activity module and a second activity module, and prevents the user from accessing a third activity module (904). The method selects the activity modules based on an activity module graph, or learning map, that includes nodes representing activity modules and edges that connect each node.

Nodes within the activity module graph are ranked so that a user is provided with the lowest-level activity module that the user is ready for, based on the user's classification. Activity modules can be electronic books that include content related to particular skills. In some implementations, the user must master lower-ranking activity modules before the method grants access to higher ranking activity modules, including electronic books.

Users can interact with activity modules through quests that create narrative structures around the activity modules. The narrative structures of the quests may not be connected to the content of the activity modules, therefore various users can experience the same quests while accessing different activity modules. For example, while a user may be granted access to a first activity module and a second activity module, an additional user may be granted access to a third activity module and a fifth activity module. The narrative structure of the quest may be the same for both users.

The method 900 receives interaction data based on the user interacting with the first activity module (906). The interaction data can include, for example, the amount of time that a user spent performing the activity module, the number of correct and incorrect responses selected by the user, and/or the number of attempts that a user made before successfully completing the activity module.

The interaction data can be presented in a graphical user interface that displays the progress of a user. The graphical user interface can display the progress of the user with respect to activity modules that are associated with the classification of the user, such as a student's school grade, as well as activity modules that are associated with an additional classification of a user, such as a classification based on previous interaction data. Based on interaction data, a user may have one classification for activity modules related to a certain skill, and a higher or lower classification for activity modules related to other skills. The graphical user interface can display the progress of multiple users, such as multiple students within a class or grade.

The method 900 determines that the interaction data indicates an improper classification of the user (908). The method 900 may determine that the classification is too low or too high, based on the interaction data. The method 900 makes the classification determination in near-real-time, so as to update the user's activity module access before the user attempts to access additional activity modules.

Based on the interaction data, the method 900 maintains the classification of the user, grants the user access to a fourth activity module, and prevents the user from accessing the second activity module (910). This may occur if the user interaction with the first activity module is unsatisfactory. Unsatisfactory completion of the first activity module may indicate that the classification of the user is improper, and that the user requires mastery of prerequisite skills before advancing to the second activity module.

An example first activity module covers the skill of decoding words with consonant blends. If the user interaction with the first activity module is unsatisfactory, the method 900 may prevent the user from advancing to the second activity module covering the skill of decoding words with common rhyme families. In this case, the method 900 may instead grant access to a fourth activity module, covering a more basic skill, such as the skill of identifying individual letter sounds. The fourth activity module is identified by referencing the activity module graph and identifying nodes that connect to the first activity module node.

The method 900 can receive additional interaction data based on the user interacting with the fourth activity module. Based on the additional interaction data, the method 900 can re-grant the user access to the second activity module. This may occur, for example, if the user interaction data with the fourth activity module is satisfactory. Satisfactory completion of the fourth activity module may indicate that the user has mastered the more basic skill covered by the fourth activity module that is required before mastering the more advanced skill covered second activity module. In the example above, the user may master the fourth activity module skill of identifying individual letter sounds. Based on the interaction data from the fourth activity module, the method can re-grant the user access to the second activity module, which in this example is decoding words with common rhyme families.

Figure 10:
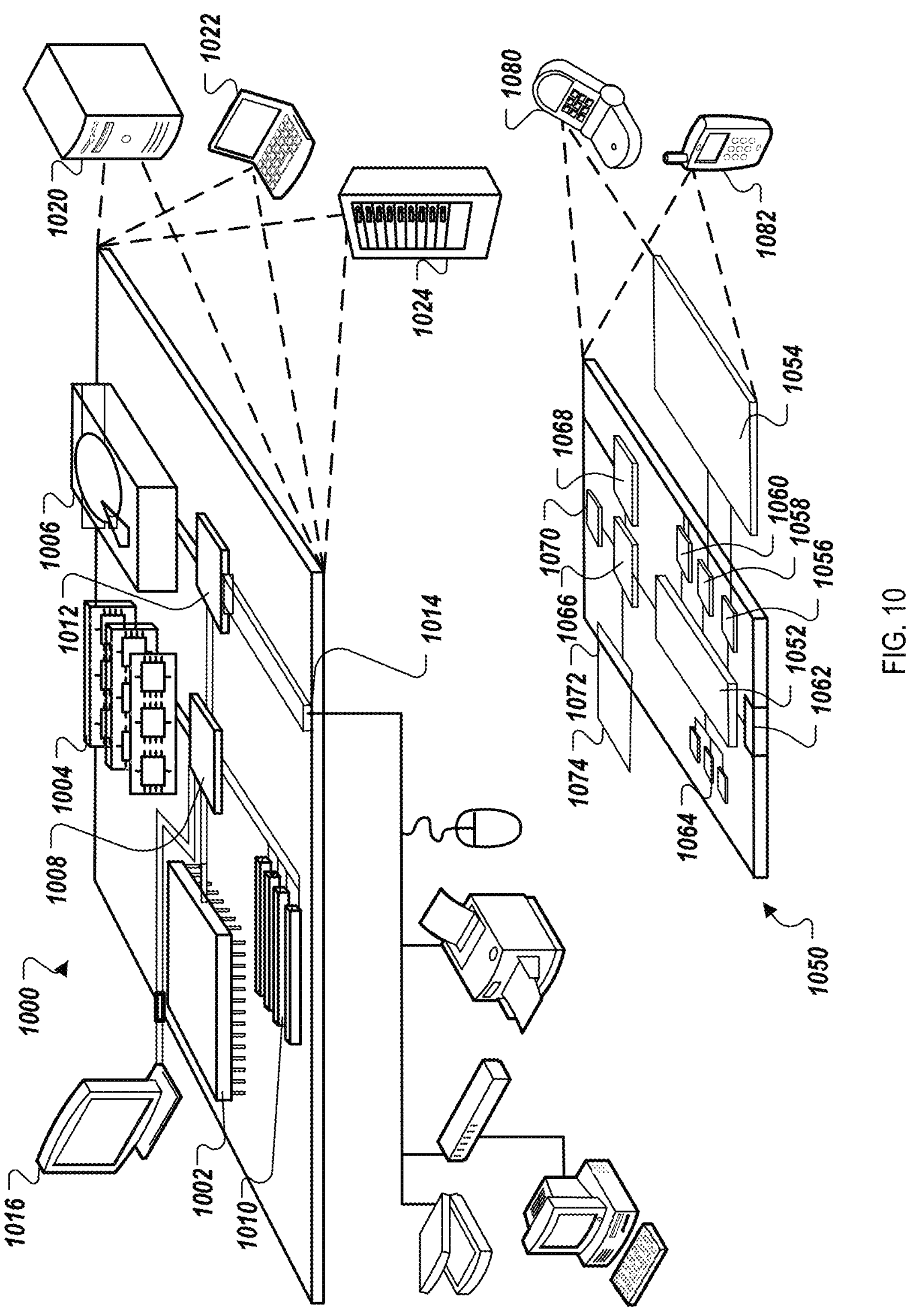
FIG. 10 shows an example of a computer device and a mobile computer device, which may be used with the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, tablets, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various buses, and may be mounted on a common motherboard or in other manners as appropriate. The processor 1002 may process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer-readable or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 may execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display), an OLED (Organic Light Emitting Diode) display, or an electronic ink display, or other appropriate display software. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 may be implemented as one or more of a computer-readable medium or media, a volatile memory unit or units, or a non-volatile memory unit or units. Expansion memory 1074 may also be provided and connected to device 1050 through expansion interface 1072, which may include, for instance, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.), and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, a laptop, or other similar mobile device. In some implementations, the computing device 1050 may be implemented in a non-mobile computing device such as a desktop, multiple servers, or other similar non-mobile device.

Device 1050 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 1050 and used to update the display of the respective devices 1050 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:

providing, to each of a first user and a second user, selectable options for a plurality of quests, each quest having a respective narrative structure, the selectable options being presented to the first user on a display of a first device and to the second user on a display of a second device;

receiving, from the first user through the first device and from the second user through the second device, input indicating selection of a first quest of the plurality of quests;

generating, for the first user, a first activity for the first quest based on:

the narrative structure of the first quest; and a skill level of the first user;

generating, for the second user, a second activity for the first quest based on:

the narrative structure of the first quest; and a skill level of the second user, wherein the second activity for the first quest is different from the first activity for the first quest due to the skill level of the second user being different from the skill level of the first user:

providing, to the first user through the first device, access to the first activity for the first quest; and providing, to the second user through the second device, access to the second activity for the first quest.

2. The computer-implemented method of claim 1, comprising:

computing a score for the first user based on interaction of the first user with the first activity; and generating, for the first user, a third activity for the first quest based on (a) the narrative structure of the first quest and (b) the computed score for the first user.

3. The computer-implemented method of claim 1, comprising:

computing a score for the first user based on interaction of the first user with the first activity; and based on the computed score for the first user, determining to provide, to the first user, access to a third activity for the first quest.

4. The computer-implemented method of claim 1, wherein the second activity for the first quest being different from the first activity for the first quest comprises the first activity and the second activity corresponding to different learning objectives.

5. The computer-implemented method of claim 1, wherein the first activity and the second activity have a same narrative.

6. The computer-implemented method of claim 1, comprising:

providing, to a third user, selectable options for the plurality of quests, the selectable options being presented to the third user on a display of a third device;

receiving, from the third user through the third device, input indicating selection of a second quest of the plurality of quests;

generating, for the third user, a third activity for the second quest based on:

the narrative structure of the second quest; and a skill level of the third user, wherein the skill level of the third user is the same as the skill level of the first user, the third activity for the second quest being different from the first activity for the first quest;

providing, to the third user through the third device, access to the third activity for the second quest;

computing a score for the third user based on interaction of the third user with the third activity; and based on the computed score, determining to provide, to the third user, access to a fourth activity for the second quest.

7. The computer-implemented method of claim 6, wherein the third activity for the second quest being different from the first activity for the second quest comprises the first activity and the third activity having different narratives.

8. The computer-implemented method of claim 6, wherein the first activity and the third activity correspond to a same learning objective due to the skill level of the third user being the same as the skill level of the first user.

9. The computer-implemented method of claim 1, wherein generating the first activity for the first quest comprises:

accessing a learning map representing learning objectives and expected progressions between the learning objectives;

selecting, based on the skill level of the first user, a first learning objective from the learning map; and generating the first activity based on the first learning objective, wherein interaction of the first user with the first activity enables the first user to practice the first learning objective.

10. The computer-implemented method of claim 1, wherein the first activity corresponds to a first learning objective, the method comprising:

determining that interaction of the first user with the first activity satisfies criteria for mastery of the first learning objective; and providing, to the first user and through the first device, access to an electronic book, wherein mastery of the first learning objective is prerequisite to accessing the electronic book.

11. The computer-implemented method of claim 10, comprising determining that mastery of the first learning objective is prerequisite to accessing the electronic book based on a learning map representing learning objectives, electronic books, and relationships between the learning objectives and the electronic books.

12. The computer-implemented method of claim 1, comprising receiving data indicating the skill level of the first user.

13. The computer-implemented method of claim 1, comprising determining the skill level of the first user based on at least one of:

test scores of the first user;

a school grade of the first user; or previous interactions of the first user with activities of the plurality of quests.

14. The method of claim 1, comprising:

receiving data indicating a classification of each of a plurality of users including the first user, wherein the classification comprises a school grade or school class;

identifying a set of users having a same classification; and generating, for presentation on a display of a third device, a graphical user interface indicating progress of the set of users through the plurality of quests.

15. The method of claim 1, wherein:

a narrative structure of each quest of the plurality of quests includes a story to be presented to a user, wherein interaction of the user with activities of the quest affects a plot of the story.

16. A system comprising:

one or more computers; and one or more storage devices storing instructions that are operable, when executed by the one or more computers, to cause the one or more computers to perform operations comprising:

providing, to each of a first user and a second user, selectable options for a plurality of quests, each quest having a respective narrative structure, the selectable options being presented to the first user on a display of a first device and to the second user on a display of a second device;

receiving, from the first user through the first device and from the second user through the second device, input indicating selection of a first quest of the plurality of quests;

generating, for the first user, a first activity for the first quest based on:

the narrative structure of the first quest; and a skill level of the first user;

generating, for the second user, a second activity for the first quest based on:

the narrative structure of the first quest; and a skill level of the second user, wherein the second activity for the first quest is different from the first activity for the first quest due to the skill level of the second user being different from the skill level of the first user;

providing, to the first user through the first device, access to the first activity for the first quest; and providing, to the second user through the second device, access to the second activity for the first guest.

17. A non-transitory computer-readable medium storing software comprising instructions executable by one or more computers which, upon such execution, cause the one or more computers to perform operations comprising:

providing, to each of a first user and a second user, selectable options for a plurality of quests, each quest having a respective narrative structure, the selectable options being presented to the first user on a display of a first device and to the second user on a display of a second device;

receiving, from the first user through the first device and from the second user through the second device, input indicating selection of a first quest of the plurality of quests;

generating, for the first user, a first activity for the first quest based on:

the narrative structure of the first quest; and a skill level of the first user;

generating, for the second user, a second activity for the first quest based on:

the narrative structure of the first quest; and a skill level of the second user, wherein the second activity for the first quest is different from the first activity for the first quest due to the skill level of the second user being different from the skill level of the first user;

providing, to the first user through the first device, access to the first activity for the first quest; and providing, to the second user through the second device, access to the second activity for the first quest.

18. The computer-implemented method of claim 4, wherein the first activity and the second activity correspond to different learning objectives due to the skill level of the second user being different from the skill level of the first user.

19. The system of claim 16, the operations comprising:

computing a score for the first user based on interaction of the first user with the first activity; and based on the computed score for the first user, determining to provide, to the first user, access to a third activity for the first quest.

20. The non-transitory computer-readable medium of claim 17, the operations comprising:

computing a score for the first user based on interaction of the first user with the first activity; and based on the computed score for the first user, determining to provide, to the first user, access to a third activity for the first quest.

* * * * *